United States Patent Office 2,902,824
Patented Sept. 8, 1959

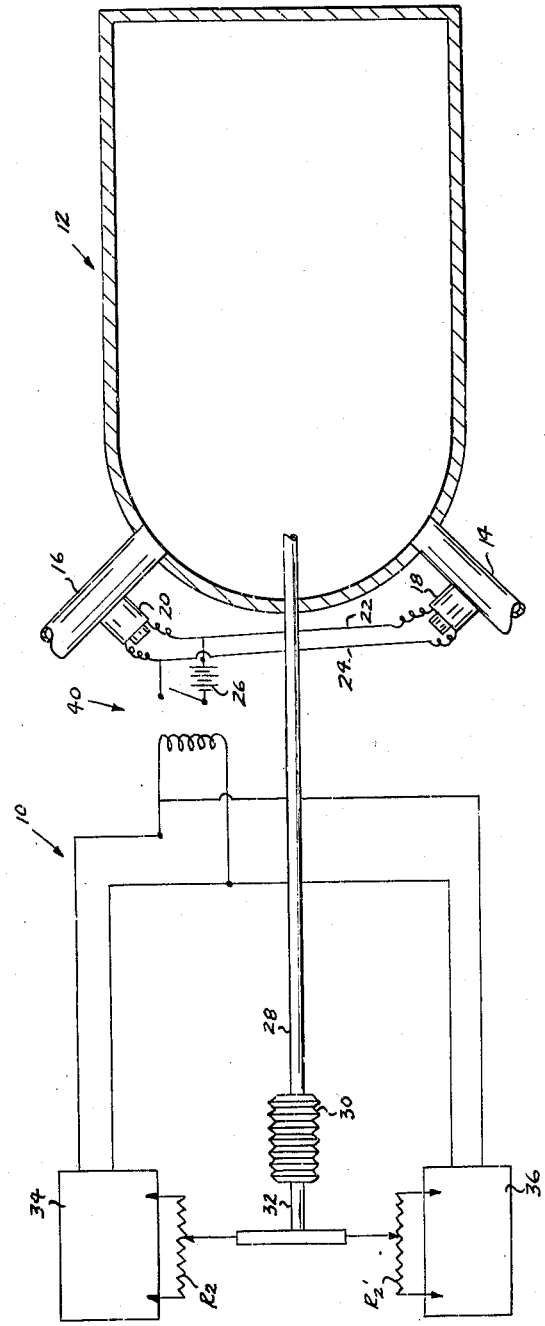

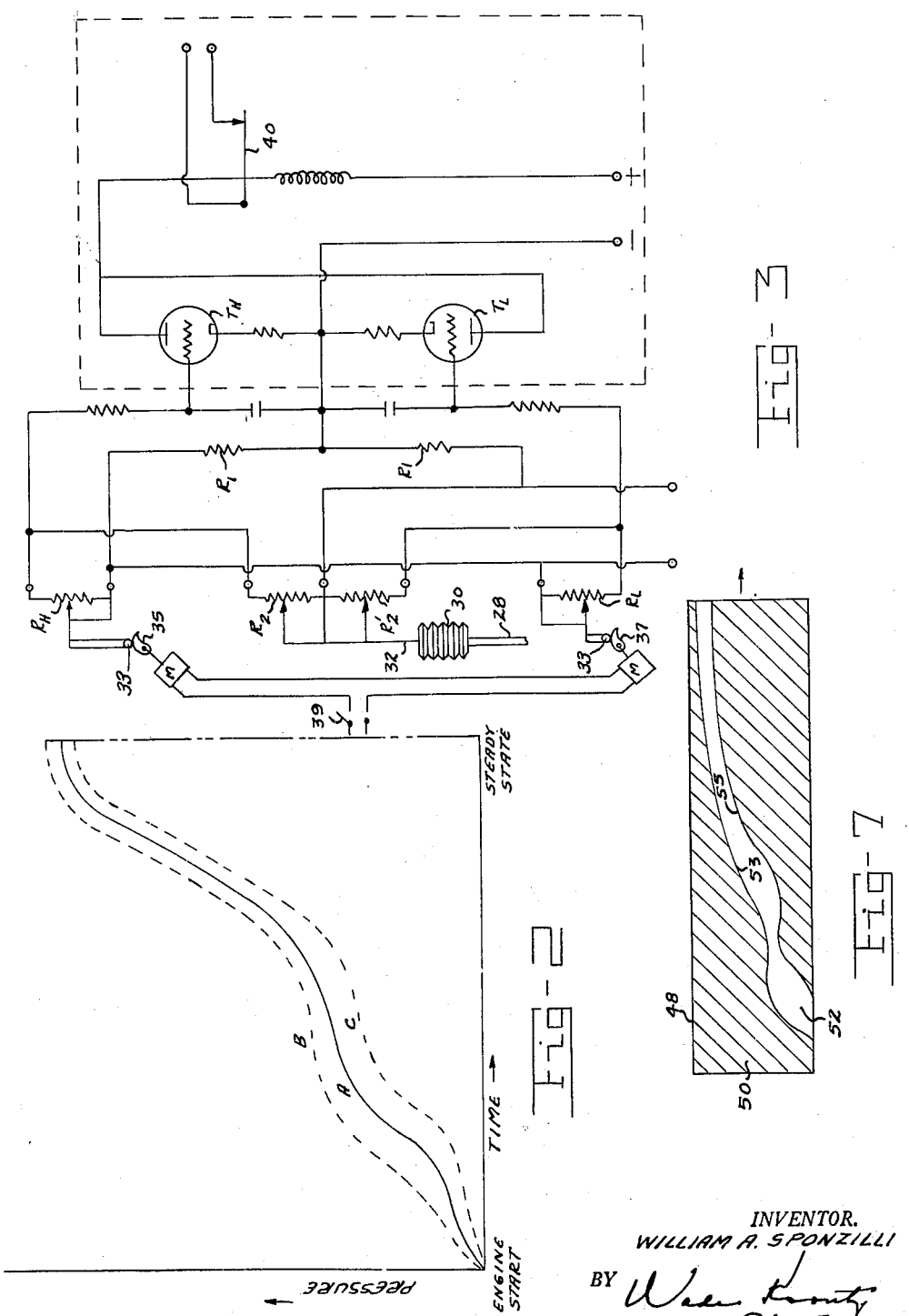

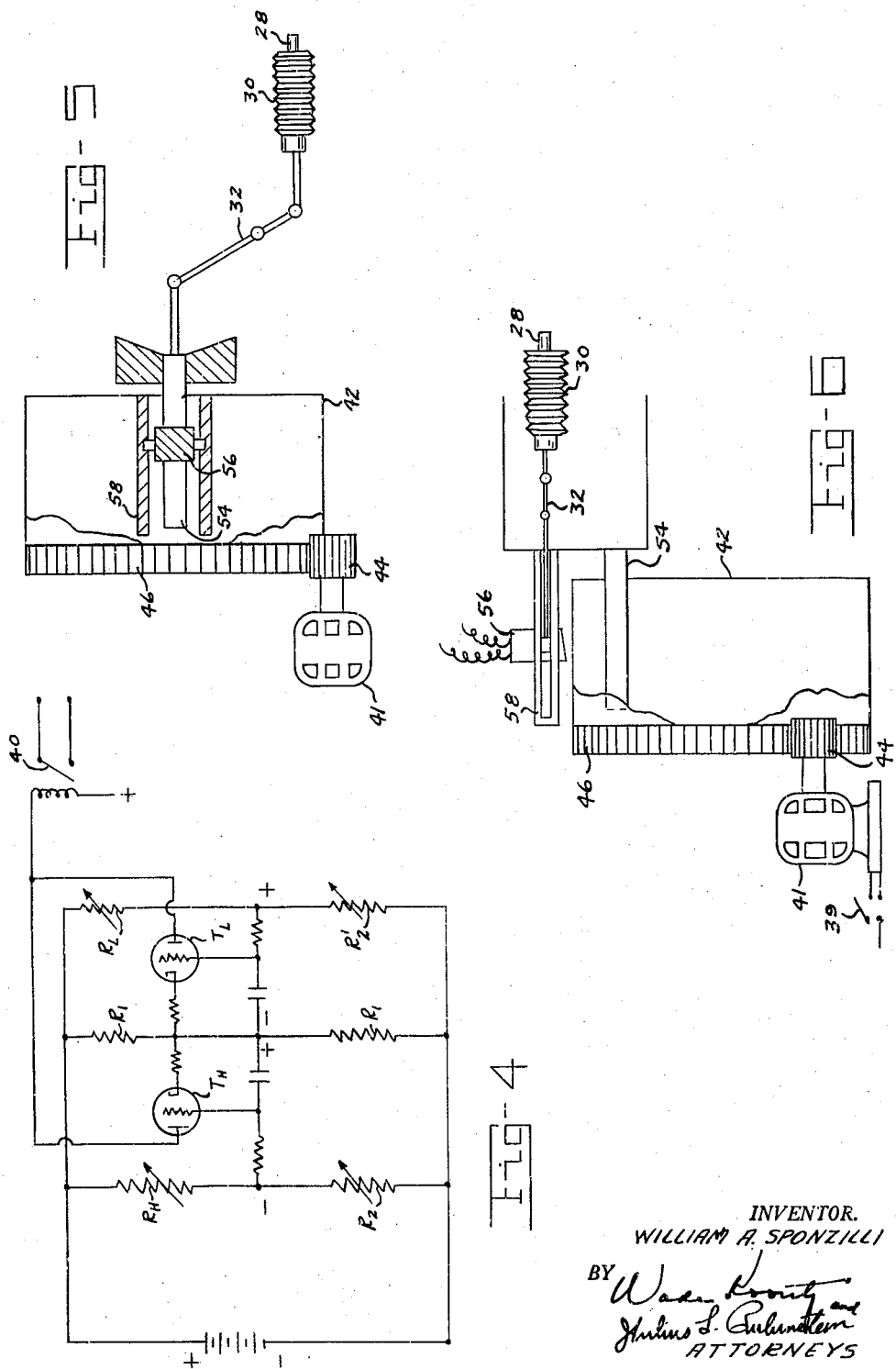

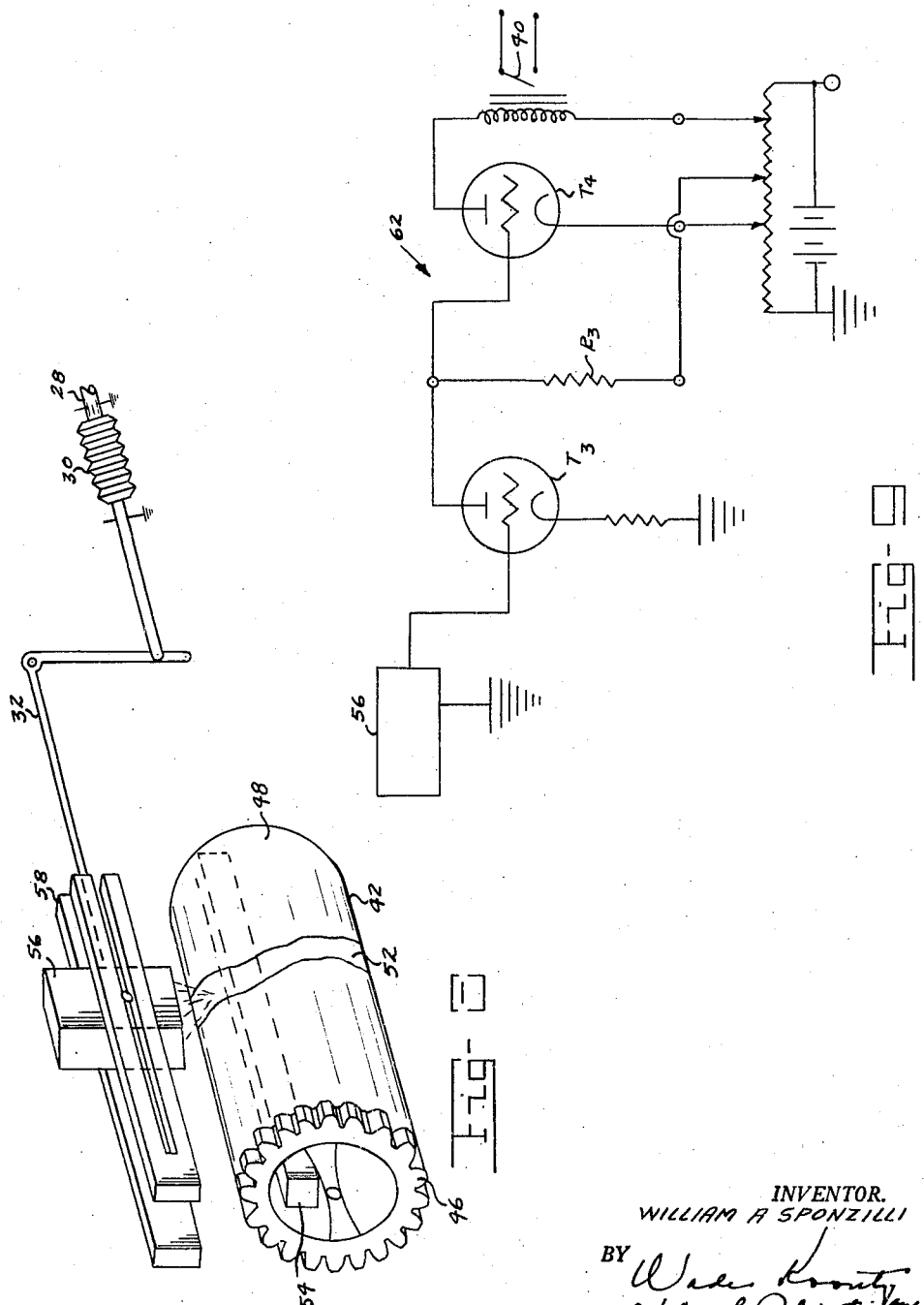

2,902,824

ELECTRONIC MONITORS FOR THRUST CHAMBER PRESSURE IN REACTION MOTORS

William A. Sponzilli, Cincinnati, Ohio, assignor to the United States of America as represented by the Secretary of the Air Force Application June 28, 1956, Serial No. 594,667

10 Claims. (Cl. 60—39.09)

(Granted under Title 35, U.S. Code (1952), sec. 266)

The invention described herein may be manufactured and used by or for the United States Government for governmental purposes without payment to me of any royalty thereon.

This invention relates to a monitor and, more particularly, to a monitor for transient starting thrust chamber pressures in a liquid rocket engine.

As a general rule, the most critical period of rocket engine operation occurs during starting conditions. In particular, the thrust chamber pressure increase during starting conditions must follow a comparatively well-defined path until it reaches a steady state. Should this thrust chamber build-up vary from this well-defined path beyond certain limits, destructive malfunction is likely to occur. As an added complication, the permissible deviation from this well-defined path of pressure build-up is not constant. Mechanism can, of course, be devised to shut down the rocket unit whenever the thrust chamber pressure build-up deviates from its proper path by the minimum limit occurring over the entire transient pressure build-up. Such a procedure would, however, be expensive and time consuming since the rocket unit would be shut down more often than necessary. A more desirable approach would be to take advantage of the variations in the limits for the thrust chamber pressure which occur during starting transients by permitting a greater latitude in pressure deviation at points along the pressure build-up path where engine design conditions permit such greater pressure deviations.

In the past, the hazard of destructive malfunction has been minimized through the use of a plurality of R-C timers. These pressure time switches functioned in such a way as to shut down the rocket unit when a certain thrust chamber pressure was not reached within a given time interval. This procedure had two serious deficiencies. In the first place, it failed to provide a continuous monitor of thrust chamber pressure during the entire starting transient. For example, if a given number of R-C timers were placed in the system, there was nothing to alert the system for shutdown should the thrust chamber pressure rise or fall to a dangerous limit between the interval of one R-C timer with respect to the next. In the second place, the use of an R-C timer was a regressive check rather than a progressive-regressive check. In other words, the R-C timers would only shut down if a certain pressure was not reached within a certain time interval. There was no provision for shutdown if the thrust chamber pressure should rise above the normal or safe value prescribed for safe operation before the time interval was consumed. This was manifestly inadequate since for any instant of operation, there was an upper and lower safe limit for thrust chamber pressure regardless of the thrust chamber pressure build-up throughout the entire starting operation.

A principal object of this invention is to provide an apparatus for continuously monitoring the thrust chamber pressure during starting transients.

A further object of this invention is to provide an apparatus for detecting variations in thrust chamber pressure and to provide means for shutting down the rocket engine when the thrust chamber pressure varies from the normal or safe value by more than a predetermined amount.

Still another object of this invention is to provide an apparatus for detecting variations in thrust chamber pressure beyond predetermined limits, and includes means for varying these predetermined limits in accordance with engine design requirements.

Yet another object of this invention is to provide monitoring apparatus which utilizes electronic bridge means for detecting variations in thrust chamber pressure beyond certain predetermined limits.

An additional object of this invention is to provide monitoring apparatus for a rocket engine which utilizes a photoelectric cell in combination with a tape and a tape drive mechanism to detect variations in thrust chamber pressure beyond predetermined limits.

These and other objects of this invention will become more apparent when read in the light of the specification and accompanying drawings in which:

Fig. 1 is a schematic diagram of the thrust chamber of a rocket engine combined with the rocket engine control system.

Fig. 2 is a diagram showing the variation of thrust chamber pressure with time during starting operations and showing, in addition, how the upper and lower pressure limits in the thrust chamber also vary with time.

Fig. 3 is a circuit diagram of an embodiment of the invention designed to continuously monitor the upper and lower pressure limits for the thrust chamber during starting operation.

Fig. 4 is a rearrangement of the circuit diagram shown in Fig. 3 disclosing at any instant the bridge circuit for monitoring the upper and lower pressure limits for the thrust chamber.

Fig. 5 is a top view partly in cross section of another embodiment of an apparatus designed to continuously monitor thrust chamber pressure which utilizes a photoelectric detecting system.

Fig. 6 is a side view of the photoelectric monitoring system of Fig. 5 showing more clearly the supporting structure for the photoelectric cell.

Fig. 7 is a view of a top portion of the tape used in the photoelectric pressure limit detecting system and shows how the boundaries between the opaque and translucent portions of the tape vary in proportion to the variations in the upper and lower permissible pressure limits in the thrust chamber.

Fig. 8 is a perspective view of a photoelectric monitoring system showing in particular the tape mounted on a spool and positioned between a light source and a photoelectric cell.

Fig. 9 is a circuit diagram of the engine control system in combination with the photoelectric monitor.

Referring now to Fig. 1, the monitor for the thrust chamber pressure in a liquid fuel rocket engine indicated generally at 10 is connected to the rocket engine thrust chamber 12. Secured to this thrust chamber is a liquid fuel intake conduit 14 and a liquid oxygen intake conduit 16. Mounted in these conduits are electrically actuated motor driven control valves 18 and 20. These valves are electrically connected together by means of wires 22 and 24 and operate simultaneously when the source of electric power 26 is connected to them. A conduit 28 extends from within the thrust chamber to a bellows 30. This bellows moves in response to variations in pressure in the thrust chamber and causes linking mechanism 32 to move along with it. This linking mechanism 32 actuates variable resistors $R_2$ and $R_2'$ which are connected to the upper pressure limit portion of the monitor indicated generally at 34 and the lower pressure limit portion of the monitor indicated generally at 36. A relay switch 40 is connected to the monitor in such a way that should the instantaneous pressure in the thrust chamber 12 exceed the instantaneous upper pressure limit or drop below the lower pressure limit the relay will be actuated and will opearte the motor driven valves 18 and 20. Alternatively, the bellows 30 and the linking mechanism 32 can be connected to a photoelectric cell as disclosed in the modifications shown in Figs. 4 to 9.

As seen in Fig. 2, curve A shows how the transient thrust chamber pressure in a typical rocket engine increases with time until the steady state condition is reached. Curve B discloses the safe upper limit for thrust chamber pressures during transient starting conditions, and curve C discloses the safe lower limits. If, at any instant during the starting transient conditions, the actual pressure in the thrust chamber rises above or falls below the limits defined by curves B or C, destructive malfunction is likely to occur. It is noted that the degree of tolerable pressure variations from the anticipated curve is not constant. This means that the thrust chamber pressure is more critical at some intervals during starting operation and less critical at other intervals. Curves B and C may be determined by a theoretical analysis of the engine or by a straight forward empirical approach.

Fig. 3 discloses one embodiment of this invention. As seen in Figs. 1 and 3, sensing bellows 30 actuates a pair of variable resistances $R_2$ and $R_2'$, so that both resistances vary in proportion to changes in pressure in the thrust chamber. A power driven cam 35 whose peripheral surface varies radially in accordance with variations in the upper pressure limit of the thrust chamber is driven by a motor M. This peripheral surface is engaged by roller contact 33 which is connected to variable resistance $R_H$. When the cam is rotated, it actuates variable resistance $R_H$ so that it varies in proportion to changes in the upper pressure limit as disclosed by curve B in Fig. 2. Similarly another power driven cam 37 actuates variable resistance $R_L$ through its roller contact 33 so it varies in proportion to changes in the lower pressure limit as disclosed by curve C. This is accomplished by connecting power driven cams 35 and 37 together so they are both actuated and rotated together simultaneously. In addition, these power driven cams are hooked up to the rocket engine starting switch 39, so that at the instant switch 39 is closed, the rocket motor will start and cams 35 and 37 will actuate variable resistances $R_H$ and $R_L$.

Variable resistances $R_2$ and $R_H$ form two elements in an upper limit Wheatstone bridge circuit, and variable resistance $R_2'$ and $R_L$ form two elements in a lower limit pressure bridge circuit. The circuit of Fig. 3 has been rearranged in Fig. 4 to more clearly disclose the bridge circuit at any instant of time. It is noted that identical resistances $R_1$ are common to both bridge circuits and comprise a third and fourth element for each. Detecting and amplifying tubes $T_H$ and $T_L$ are connected across each bridge circuit. These tubes are connected to the bridge circuits and biased in such a way that they become conductive and trip the motor control or shutdown relay 40 when either of the bridge circuits are balanced. Since the third and fourth elements $R_1$ in each bridge circuit are identical, it is clear that the upper limit bridge circuit will be balanced whenever the instantaneous value of $R_2$ equals the instantaneous value of $R_H$ and the lower limit bridge circuit will be balanced whenever the instantaneous value of $R_2'$ equals the instantaneous value of $R_L$. This is precisely what is necessary to effectively monitor the transient thrust chamber pressure.

In operation the rocket engine is started, the rocket chamber pressure actuates variable resistances $R_2$ and $R_2'$ by means of bellows 30. At the same time the power driven cams 35 and 37 are started and drive variable resistances $R_H$ and $R_L$ in such a way as to cause them to vary in proportion to changes indicated by curves B and C in Fig. 2. Whenever the values of $R_2$ or $R_2'$ equals $R_H$ or $R_L$, one or the other of the amplifying tubes $T_H$ or $T_L$ become conductive and actuates relay 40 to shut down or control the engine.

Figs. 5 to 9 disclose another form of this invention. In this embodiment, an electrical motor 41, is connected to the rocket engine through starting switch 39, so they start simultaneously. This motor drives a spool or support 42 at a predetermined rate by means of pinion gear 44 and a gear 46 which is integral with the spool. Tape 48 mounted on the spool has opaque portions 50 and translucent portions 52, see Fig. 7. A source of light 54 is mounted inside the spool by any convenient means to illuminate the translucent portion, and a photoelectric cell 56 is movably mounted on support guide 58, see Fig. 8. The photoelectric cell 56 is connected by mechanical linkages 32 to the pressure responsive bellows 30 so it moves in support 58 in proportion to changes in pressure in the thrust chamber and in a direction transverse to the direction of motion of the tape. Photoelectric cell 56 is positioned over the tape 48 on spool 42 so it can only receive light from the illuminated translucent portion 52, see Figs. 7 and 8. The boundaries 53 and 55 between the translucent and opaque portions of the tape vary transversely along the tape. When the tape is driven at a predetermined rate past a certain point, in this case the position of the photoelectric cell over the tape, boundary 53 varies in proportion to changes in the upper pressure limit of the thrust chamber as shown in curve B in Fig. 2, while boundary 55 varies in proportion to changes in the lower pressure limit for the thrust chamber as shown in curve C.

In operation, motor 41 operates spool 42 driving tape 48 at a predetermined rate. As the pressure in the thrust chamber increases, the photoelectric cell 56 riding in support 58 is actuated by bellows 30 acting on the linkages 32. When the thrust chamber pressure is within the empirically determined safe upper and lower limits, the photoelectric cell is designed to be directly over the translucent portion 52 of the tape 48 as the spool rotates. When this happens the photoelectric cell 56 is actuated by the light source 54. However, should the pressure limits in the thrust chamber 12 be exceeded at any instant, the bellows 30 moving in response to changes in the thrust chamber pressure, will drive the photoelectric cell 56 away from the translucent portion 52 of the tape and over into the opaque portion 50. When this happens, the photoelectric cell 56 is cut off from the light source 54 and becomes deactivated. Then the amplifying circuit 62 disclosed in Fig. 9, which is controlled by the photoelectric cell 56, actuates relay 40 to shut down the rocket engine. This happens because the output of the photoelectric cell is connected to the grid of the amplifying tube $T_3$. The decrease in output of the photoelectric cell 56, when the opaque portion of the tape masks the light from the light source 54, causes the grid in the tube $T_3$ to become more negative. This decreases the plate current through the tube and causes a decrease in the voltage drop across load resistance $R_3$. This drop in voltage across $R_3$ acts to raise the voltage on the grid of tube $T_4$ making it more conductive. The output of tube $T_4$ is connected to relay 40 and when the tube becomes conductive, the relay is actuated and the rocket engine is shut down.

Obviously, many modifications and variations of the present invention are possible in the light of the above teachings. It is, therefore, to be understood that within the scope of the appended claims the invention may be practiced otherwise than as specifically described.

I claim:

1. An apparatus for monitoring transient thrust chamber pressure in a reaction motor comprising means responsive to thrust chamber pressure, an electrical bridge circuit, one element of said bridge circuit comprising a first variable resistance, said first variable resistance being connected to and actuated by said means responsive to thrust chamber pressure to cause said first variable resistance to assume resistive values proportional to the thrust chamber pressure, a second variable resistance in said bridge circuit, actuating means connected to said second variable resistance to cause it to continuously assume a resistive value proportional to the continuously variable pressure limits for the thrust chamber, said electrical bridge circuit being balanced when the instantaneous thrust chamber pressure equals the instantaneous pressure limit for the thrust chamber, bridge balance detecting means connected to said bridge circuit, motor control means connected to said bridge balance detecting means to be actuated when said bridge is balanced.

2. The apparatus set forth in claim 1 wherein said actuating means for said second variable resistance comprises a power driven cam, said power driven cam connected to said rocket motor so that said cam and motor are actuated simultaneously.

3. The apparatus set forth in claim 1 wherein said bridge balance detecting means comprises an amplifier, said amplifier connected to said bridge circuit and being actuated when said bridge circuit is balanced, said motor control means connected to said amplifier and being actuated when said amplifier is actuated.

4. An apparatus for monitoring transient thrust chamber pressure in a reaction motor comprising means responsive to thrust chamber pressure, upper and lower limit electrical bridge circuits, one element in each of said bridge circuits comprising a first variable resistance, each of said first variable resistances connected to and actuated by said means responsive to thrust chamber pressure, a second variable resistance comprising a second element in each of said bridge circuits, actuating means connected to each of the second variable resistances, the actuating means connected to the second variable resistances in the upper limit electrical bridge circuit causing said second variable resistance in that circuit to continuously assume a resistive value proportional to the continuously variable upper limit for the thrust chamber pressure, the actuating means connected to the second variable resistance in the lower limit electrical bridge circuit causing the second variable resistance in that circuit to continuously assume a resistive value proportional to the continuously variable lower limit for thrust chamber pressure, said upper limit bridge circuit being balanced when instantaneous thrust chamber pressure equals the permissible upper pressure limit for the thrust chamber, said lower limit bridge circuit designed to be balanced when the instantaneous thrust chamber pressure equals the lower limit pressure for the chamber, bridge balance detecting means connected to said bridge circuits and adapted to be actuated when other of said bridge circuits are balanced, motor control means connected to said bridge balance detecting means and adapted to be actuated when either of said bridge circuits is in balance.

5. An apparatus for monitoring transient thrust chamber pressures in a rocket engine comprising a support, a tape movably mounted on said support, driving means connected to said tape to drive the tape at a predetermined rate, said driving means being connected to said rocket engine so they start simultaneously, said tape having an elongated portion coextensive with the surface of the tape and extending in the direction of the motion of the tape, said elongated portion having physical characteristics different from the remaining portion of the tape, the boundary between the edges of said elongated portion varying transversely along the length of the tape and in proportion to transient changes in the pressure limits for the thrust chamber when said tape is driven at a predetermined rate past a predetermined point, physical state detecting means sensitive to the differences in physical state between the elongated portion and the remaining portion of the tape, means connected to said thrust chamber pressure and movably responsive to changes in pressure in said thrust chamber, a part of said physical state detecting means being connected to said movably responsive means and being movable in a direction transverse to the direction of motion of the tape, said part of said physical state detecting means reacting differently when it is over the elongated portion of the tape than when it is over the remaining portion of the tape, thus permitting the physical state detecting means to sense when said part moves across the boundary separating the portions of the tape, and rocket engine control means connected to said physical state detecting means to be actuated when said part moves across said boundary.

6. An apparatus for monitoring transient thrust chamber pressures in a rocket engine comprising a support, a tape movably mounted in said support, driving means connected to said tape to drive said tape at a predetermined rate, said driving means being connected to said rocket engine so they start together, said tape having an elongated translucent portion coextensive with the surface of the tape and extending in the direction of motion of tape, the remaining portion of the tape being opaque, the boundaries between the translucent portion of the tape and the opaque portion of the tape varying transversely along the length of the tape and in proportion to transient changes in the pressure limits for the thrust chamber when said tape is driven at a predetermined limit past a predetermined point, a light source to illuminate the translucent portion of the tape positioned on one side of the tape, a light sensitive means positioned on the other side of the tape at said predetermined point to respond only to light from said illuminated translucent portion of the tape when it is over that portion of the tape, means connected to said chamber and movably responsive to changes in thrust chamber pressure, said light sensitive means connected to said movably responsive means being movable in a direction transverse to the direction of motion of the tape, and engine control means connected to said light sensitive means to be actuated when said light sensitive means reacts to movement across the boundary between the illuminated translucent portion and the opaque portion of the tape.

7. The apparatus set forth in claim 6 wherein one boundary between the illuminated translucent portion of the tape and the opaque portion of the tape varies in response to transient changes in the upper pressure limit for the thrust chamber pressure and the other boundary between the illuminated translucent portion of the tape and the opaque portion of the tape varies in response to transient changes in the lower pressure limit when said tape is driven at a predetermined rate past a predetermined point.

8. The apparatus set forth in claim 7 including an amplifier connected to said light sensitive means, said amplifier being designed to be actuated when the light sensitive means, moving in response to pressure changes in the thrust chamber, moves so that the opaque portion of the tape prevents the light sensitive means from receiving light, said motor control means being connected to the amplifier and adapted to be actuated whenever said amplifier is actuated.

9. In a rocket engine, a thrust chamber wherein critical upper and lower starting pressures do not vary uniformly with time, an established and previously determined pattern, characteristic for each engine and inherent in the operation thereof, of critical upper and lower starting pressures varying with respect to time above and below which dangerous malfunction occurs, sensing means continuously responsive to thrust chamber pressures, linking means controlled by said sensing means for transmitting movement, means structurally incorporating said pattern and means operated by said linking means for shutting down said rocket engine when the pressure within said pressure chamber at any instant exceeds the critical upper limit or drops below the critical lower limits designed for that instant in the established pattern.

10. In a rocket engine, a thrust chamber wherein critical upper and lower starting pressures do not vary uniformly with time, a pattern of critical upper and lower starting pressures with respect to time, a conduit communicating with the interior of said thrust chamber, a bellows, said bellows being subject to predetermined movement in response to changes in thrust chamber pressures, means wherein the pattern of critical upper and lower starting pressures is incorporated for shutting down said rocket engine when the pressure within said pressure chamber at any instant exceeds or drops below the respective upper or lower limits designated for that instant in the established pattern, and means for transmitting movement from said bellows to said pattern incorporating means.

References Cited in the file of this patent
UNITED STATES PATENTS 2,667,228     Wood et al. _____ Jan. 26, 1954